(12) United States Patent
Tanaka et al.

(10) Patent No.: US 10,280,869 B2
(45) Date of Patent: May 7, 2019

(54) RUBBER-METAL LAMINATED GASKET MATERIAL

(71) Applicant: NOK Corporation, Tokyo (JP)

(72) Inventors: Nobuaki Tanaka, Fukushima (JP); Takeshi Sato, Fukushima (JP); Katsumi Abe, Kanagawa (JP)

(73) Assignee: NOK Corporation, Tokyo (JP)

( * ) Notice: Subject to any disclaimer, the term of this patent is extended or adjusted under 35 U.S.C. 154(b) by 395 days.

(21) Appl. No.: 14/901,273

(22) PCT Filed: Jan. 24, 2014

(86) PCT No.: PCT/JP2014/051513
§ 371 (c)(1),
(2) Date: Dec. 28, 2015

(87) PCT Pub. No.: WO2014/208113
PCT Pub. Date: Dec. 31, 2014

(65) Prior Publication Data
US 2016/0369742 A1    Dec. 22, 2016

(30) Foreign Application Priority Data
Jun. 25, 2013  (JP) ................... 2013-132628

(51) Int. Cl.
| | |
|---|---|
| *F02F 11/00* | (2006.01) |
| *B32B 15/06* | (2006.01) |
| *B32B 7/12* | (2006.01) |
| *F16J 15/12* | (2006.01) |
| *B32B 25/14* | (2006.01) |
| *C09J 5/02* | (2006.01) |
| *C23C 22/50* | (2006.01) |
| *B32B 15/18* | (2006.01) |
| *B32B 25/00* | (2006.01) |

(52) U.S. Cl.
CPC ............. *F02F 11/002* (2013.01); *B32B 7/12* (2013.01); *B32B 15/06* (2013.01); *B32B 15/18* (2013.01); *B32B 25/00* (2013.01); *B32B 25/14* (2013.01); *C09J 5/02* (2013.01); *C23C 22/50* (2013.01); *F16J 15/122* (2013.01); *B32B 2250/02* (2013.01); *B32B 2255/06* (2013.01); *B32B 2255/20* (2013.01); *B32B 2255/26* (2013.01); *B32B 2255/28* (2013.01); *B32B 2307/306* (2013.01); *B32B 2307/714* (2013.01); *B32B 2307/7265* (2013.01); *B32B 2581/00* (2013.01); *B32B 2605/08* (2013.01); *C09J 2205/306* (2013.01); *C09J 2400/163* (2013.01); *C09J 2400/166* (2013.01); *C09J 2421/006* (2013.01)

(58) Field of Classification Search
None
See application file for complete search history.

(56) References Cited

U.S. PATENT DOCUMENTS

| | | | | |
|---|---|---|---|---|
| 3,013,904 A | * | 12/1961 | Cupery | .................. B32B 27/00 428/329 |
| 2004/0195781 A1 | | 10/2004 | Saito et al. | |
| 2010/0261004 A1 | * | 10/2010 | Higashira | ............... B32B 25/14 428/327 |
| 2011/0012315 A1 | | 1/2011 | Kitajima et al. | |
| 2012/0145282 A1 | | 6/2012 | Kodama et al. | |
| 2012/0208043 A1 | | 8/2012 | Matsuda et al. | |

FOREIGN PATENT DOCUMENTS

| | | |
|---|---|---|
| JP | 07-165953 | 6/1995 |
| JP | 11-221875 | 8/1999 |
| JP | 2000-006307 | 1/2000 |
| JP | 2006-283182 | 10/2006 |
| JP | 2011-57986 A | 3/2011 |
| JP | 5050316 | 8/2012 |
| WO | WO 2009/122618 A1 | 10/2009 |
| WO | WO 2011/002040 A1 | 1/2011 |
| WO | WO 2011/052701 A1 | 5/2011 |

OTHER PUBLICATIONS

International Search Report from corresponding PCT application No. PCT/JP2014/051513 dated Apr. 22, 2014 (4 pgs).
International Preliminary Report on Patentability and Written Opinion from corresponding PCT application No. PCT/JP2014/051513 dated Jan. 7, 2016 (5 pgs).

* cited by examiner

*Primary Examiner* — Adam Krupicka
(74) *Attorney, Agent, or Firm* — Brinks Gilson & Lione

(57) ABSTRACT

A rubber-metal laminated gasket material comprising a metal plate, a surface treating agent layer, an adhesive layer, and a rubber layer, the layers being sequentially laminated on the metal plate; wherein the surface treating agent layer is formed by applying a surface treating agent so that the coating amount on one surface is 30 to 1,000 mg/m², and the surface treating agent is free from chromium, has a mixing ratio of 20 to 90 wt. % of a fluorine-free titanium compound and 10 to 80 wt. % of alumina, and has a metal titanium content of 1 to 20 wt. %. The rubber-metal laminated gasket material has excellent LLC resistance under high temperature conditions.

5 Claims, No Drawings

RUBBER-METAL LAMINATED GASKET MATERIAL

RELATED APPLICATION

This application is a 35 U.S.C. § 371 national phase filing of International Patent Application No. PCT/JP2014/051513, filed Jan. 24, 2014, through which and to which priority is claimed under 35 U.S.C. § 119 to Japanese Patent Application No. 2013-132628, filed Jun. 25, 2013, the entire disclosure of which is hereby expressly incorporated by reference.

TECHNICAL FIELD

The present invention relates to a rubber-metal laminated gasket material, and more particularly to a rubber-metal laminated gasket material suitable to use for engine cylinder head gaskets, etc.

BACKGROUND ART

Mild steel and stainless steel are mainly used as metallic materials for engine cylinder head gasket materials for which water resistance, LLC (long life coolant) resistance, and heat resistance are required; however, when a vulcanizing adhesive is directly applied to such a metallic material to bond the material to rubber, liquid resistant adhesion durability is poor. When this rubber-metal laminated plate is subjected to an dipping test in which the plate is dipped in water, LLC, etc., adhesive peeling occurs.

The adhesion between a metal plate and rubber is improved by using, for example, zinc phosphate treatment, iron phosphate treatment, or other methods for treating the surface of a stainless steel plate. In these methods, a degreased steel plate is dipped in an acidic chemical solution to form an insoluble film on the steel plate, thereby ensuring rust prevention and adhesion to an adhesive. However, these methods had the following problems: sludge (industrial waste) was generated at the stage of forming a film; it was necessary to always supply chemical agents because chemical components were reduced due to the reaction; and the cost was high.

The present applicant has previously proposed improving resistance to water, LLC, etc., by performing coating type chromate treatment on stainless steel as a pretreatment before a vulcanizing adhesive is applied (Patent Documents 1 and 2). However, the coating type chromate treatment, which includes $Cr^{6+}$ ions, is not preferable in terms of environmental protection.

Moreover, as a method that does not use zinc phosphate, iron phosphate, chromium, etc., Patent Document 3 has proposed a surface treating agent containing an organic resin, silica, and titanium and zirconia derived from fluoride. However, since this surface treating agent contains fluorine, defluoridation of wastewater is necessary, thus requiring complex facilities.

In contrast, Patent Document 4 has proposed a fluorine-free treating agent as a modified version of the above surface treating agent. However, sufficient adhesion cannot be obtained in severe use environments such as for cylinder head gasket etc., which is exposed to high temperature LLC vapor.

PRIOR ART DOCUMENTS

Patent Documents

Patent Document 1: JP-A-2000-006307
Patent Document 2: JP-A-11-221875
Patent Document 3: JP-B-5050316
Patent Document 4: WO2011/002040
Patent Document 5: JP-A-7-165953

OUTLINE OF THE INVENTION

Problem to be Solved by the Invention

An object of the present invention is to provide a rubber-metal laminated gasket material that is free from chromium and fluorine, and that has excellent LLC resistance under high temperature conditions.

Means for Solving the Problem

The object of the present invention can be attained by a rubber-metal laminated gasket material comprising a metal plate, a surface treating agent layer, an adhesive layer, and a rubber layer, the layers being sequentially laminated on the metal plate; wherein the surface treating agent layer is formed by applying a surface treating agent so that the coating amount on one surface is 30 to 1,000 $mg/m^2$, and the surface treating agent is free from chromium, has a mixing ratio of 20 to 90 wt. % of a fluorine-free titanium compound and 10 to 80 wt. % of alumina, and has a metal titanium content of 1 to 20 wt. %.

Effect of the Invention

The rubber-metal laminated gasket material of the present invention is free from chromium and fluorine, and exhibits the following effects. For example, adhesion peeling does not occur in a heat resistance test method in LLC in consideration of the actual use environment of engine cylinder head gaskets, and excellent LLC resistance is exhibited even under high temperature conditions. Further, due to the use of a fluorine-free surface treating agent, there is no need to remove fluorine from wastewater. Surface treatment is performed by simply applying a prepared chemical agent to form a film, rather than by forming a film by a chemical reaction with a stainless steel plate, as in zinc phosphate treatment; thus, this contributes to an excellent effect that no sludge is formed.

EMBODIMENTS FOR CARRYING OUT THE INVENTION

As the metal plate, mild steel, a stainless steel plate, aluminum, aluminum die cast, or the like is used. Examples of stainless steel plates include SUS301, SUS301H, SUS304, SUS430, and the like. For gasket applications, the plate thickness is generally about 0.1 to 2 mm. A surface treating agent free from chromium and containing a fluorine-free titanium compound and alumina is applied to such a metal plate. In this case, the metal plate is preferably used after surface roughening and alkaline degreasing.

As for the weight of each compound in the surface treating agent, the mixing ratio is 20 to 90 wt. % of fluorine-free titanium compound and 10 to 80 wt. % of alumina, preferably 30 to 70 wt. % of fluorine-free titanium compound and 30 to 70 wt. % of alumina; and the titanium metal content is 1 to 20 wt. %, preferably 1 to 15 wt. %. When the mixing ratio of the fluorine-free titanium compound or the titanium metal content is lower than the above range, a surface treatment film cannot be formed; even if a film is formed, the film falls out. In contrast, when the mixing ratio of the fluorine-free titanium compound or the titanium metal content is greater than the above range, peeling occurs in the LLC dipped portion.

Examples of the fluorine-free titanium compound include titanium compounds that do not contain fluorine, such as titanium lactate, ammonium titanium lactate, titanium sulfate, titanium oxysulfate, ammonium titanium sulfate, titanium nitrate, titanium oxynitrate, and ammonium titanium nitrate; preferably ammonium titanium lactate and ammonium titanium nitrate are used. These fluorine-free titanium compounds can be used singly or in combination of two or more. Moreover, alumina sol is used as the alumina. A commercial product, such as Aluminasol-200 or Aluminasol-520 (produced by Nissan Chemical Industries, Ltd.), can be used as it is.

The surface treating agent comprising the above components as essential components and prepared by mixing them is applied to both surfaces of a metal plate by dipping, spraying, brush coating, roll coating, or the like so that the coating amount (coating weight) on one surface is 30 to 1,000 mg/m$^2$, preferably 100 to 1,000 mg/m$^2$, and then dried at room temperature or by hot air, followed by calcination at 100 to 250° C. for 1 to 20 minutes. When the coating amount is greater than this range, peeling occurs in the portion dipped in LLC liquid. In contrast, when the coating amount is less than this range, the adhesion between the metal and rubber is reduced.

To the layer of the surface treating agent applied to the metal plate and dried, a resin-based vulcanizing adhesive, such as a thermosetting phenolic resin or an epoxy resin, is applied as an adhesive for rubber. The thermosetting phenolic resin can be any thermosetting phenolic resin, such as cresol novolac type phenolic resin, cresol resol type phenolic resin, or alkyl-modified phenolic resin. Moreover, the epoxy resin is preferably a cresol novolac type epoxy resin. In this case, a bisphenol novolac type phenolic resin is used as a curing agent, and an imidazole compound is used as a curing catalyst.

Such a resin-based vulcanizing adhesive is generally prepared as an organic solvent solution having a component concentration of about 1 to 5 wt. % using an alcohol-based organic solvent, such as methanol, ethanol, or isopropanol, or a ketone-based organic solvent, such as acetone, methyl ethyl ketone, or methyl isobutyl ketone, singly or as a mixed solvent thereof. The vulcanizing adhesive is applied by the same coating method as for the surface treating agent so that the coating weight (coating amount) on one surface is 100 to 2,500 mg/m$^2$, and dried at room temperature or by hot air, followed by calcination at 100 to 250° C. for 1 to 20 minutes.

Then, unvulcanized rubber compound is applied to both surfaces of the resulting vulcanizing adhesive layer as an organic solvent solution of the rubber compound, so that the unvulcanized fluororubber compound can form on both sides vulcanizate layers having a coating film thickness on each side of about 5 to 120 μm. As the rubber, a fluororubber, a nitrilerubber, or the like is preferably used.

As the fluororubber, either polyol-vulcanizable or peroxide-vulcanizable fluororubber can be used.

Polyol-vulcanizable fluororubber generally includes copolymers of vinylidene fluoride with at least one of other fluorine-containing olefins such as hexafluoropropene, pentafluoropropene, tetrafluoroethylene, trifluorochloroethylene, vinyl fluoride, perfluoro(methyl vinyl ether), perfluoro(ethyl vinyl ether), perfluoro(propyl vinyl ether), etc. or copolymers of the fluorine-containing olefin with propylene, or the like, and can be polyol-vulcanized with a polyhydroxyaromatic compound such as 2,2-bis(4-hydroxyphenyl) propane, 2,2-bis(4-hydroxyphenyl)perfluoropropane, hydroquinone, etc.

Peroxide-vulcanizable fluororubber includes, for example, fluororubbers containing iodine and/or bromine in the molecule, and can be vulcanized (cross-linked) with an organic peroxide that is generally used in the peroxide vulcanization. In this case, it is preferable to use an organic peroxide together with a polyfunctional unsaturated compound, typically triallyl isocyanurate.

Formulation examples of the unvulcanized fluororubber compound, are shown below.

Formulation Example I

| | |
|---|---|
| Polyol-vulcanizable fluororubber (Viton E45, produced by DuPont) | 100 Parts by weight |
| Calcium metasilicate | 40 Parts by weight |
| MT carbon black | 20 Parts by weight |
| Magnesium oxide (Magnesia #150, produced by Kyowa Chemical Co.) | 6 Parts by weight |
| Calcium hydroxide | 3 Parts by weight |
| Vulcanizing agent (Curative #30, produced by DuPont) | 2 Parts by weight |
| Vulcanization accelerator (Curative #20, produced by DuPont) | 1 Parts by weight |

Formulation Example II

| | |
|---|---|
| Polyol-vulcanizable fluororubber (Viton E60C, produced by DuPont) | 100 Parts by weight |
| Vulcanizing agent (Diak No. 3, produced by DuPont) | 3 Parts by weight |
| Magnesium oxide (Magnesia #30, produced by Kyowa Chemical Co.) | 10 Parts by weight |
| MT carbon black | 30 Parts by weight |

Formulation Example III

| | |
|---|---|
| Peroxide-crosslinkable fluororubber (Daiel G901, produced by Daikin Industries, Ltd.) | 100 Parts by weight |
| Calcium metasilicate | 20 Parts by weight |
| MT carbon black | 20 Parts by weight |
| Magnesium oxide (Magnesia #150) | 6 Parts by weight |
| Calcium hydroxide | 3 Parts by weight |
| Triallyl isocyanurate | 1.8 Parts by weight |
| Organic peroxide (Perhexa 25B, produced by NOF Corporation) | 0.8 Parts by weight |

Moreover, the nitrile rubber (NBR) can be used as a compound using a sulfur-based vulcanizing agent, such as sulfur, tetramethylthiurammonosulfide, or tetramethylthiuramdisulfide; however, the nitrile rubber is preferably used as an unvulcanized nitrile rubber compound using an organic peroxide as a crosslinking agent. Formulation examples of such peroxide-crosslinkable unvulcanized nitrile rubber compounds are show below.

Formulation Example IV

| | |
|---|---|
| NBR (N-235S, produced by JSR Corporation) | 100 Parts by weight |
| SRF carbon black | 80 Parts by weight |
| Calcium carbonate | 80 Parts by weight |
| Silica powder | 20 Parts by weight |

-continued

| | |
|---|---|
| Zinc oxide | 5 Parts by weight |
| Antioxidant (Nocrac 224, produced by Ouchi Shinko Chemical Industrial Co., Ltd.) | 2 Parts by weight |
| Triallyl isocyanurate | 2 Parts by weight |
| 1,3-bis(tert-butylperoxy)isopropyl benzene | 2.5 Parts by weight |
| Plasticizers (Vulkanol OT, produced by Bayer) | 5 Parts by weight |

Formulation Example V

| | |
|---|---|
| NBR (N-237, middle-high nitrile, produced by JSR Corporation) | 100 Parts by weight |
| HAF carbon black | 80 Parts by weight |
| Silica powder | 60 Parts by weight |
| Zinc oxide | 5 Parts by weight |
| Stearic acid | 1 Parts by weight |
| Antioxidant (ODA-NS produced by Ouchi Shinko Chemical Industrial Co., Ltd.) | 1 Parts by weight |
| Organic peroxide (Perhexa 25B, produced by NOF Corporation) | 6 Parts by weight |
| N,N-m-phenylenedimaleimide | 1 Parts by weight |

The coated unvulcanized rubber layers are dried at room temperature to about 100° C. for about 1 to 15 minutes to evaporate off alcohols such as methanol, ethanol, etc., ketones such as methyl ethyl ketone, methyl isobutyl ketone, etc., aromatic hydrocarbons such as toluene, xylene, etc., or a mixture thereof, used as an organic solvent, followed by vulcanization by heating at about 150 to 230° C. for about 0.5 to 30 minutes. On this occasion, the vulcanization is performed while pressurizing, if necessary. The vulcanized rubber layers desirably have a hardness (Durometer A) of 80 or more, and a compression set (100° C. for 22 hours) of 50% or less from the viewpoint of use as gasket, without any particular limitation by formulation contents so long as satisfy the desired properties. Further, in case sticking prevention is required, an anti-sticking agent can be applied to the surfaces.

The anti-sticking agent is used to prevent sticking between rubbers themselves or between the rubber and the metal. Any anti-sticking agent can be used, so far as it can form a film layer on the vulcanized fluororubber layers, and includes, for example, silicone series, fluorine series, graphite series, wax series such as amides, paraffins, etc., polyolefin series, or polybutadiene series, and preferably an anti-sticking agent comprising a dispersion in an organic solvent of liquid 1,2-polybutadiene hydroxyl group-containing material, 1,2-polybutadiene isocyanate group-containing material, and polyolefin-based resin is used (Patent Literature 5).

EXAMPLES

The following describes the present invention with reference to Examples.

Examples 1 to 5 and Comparative Examples 1 to 3

Both surfaces of an SUS301 steel plate (thickness: 0.25 mm) were subjected to roughing and alkaline degreasing. Then, a surface treating agent comprising a predetermined ratio (described below) of a fluorine-free titanium compound (Orgatix TC-300, produced by Matsumoto Fine Chemical Co. Ltd.; titanium lactate ammonium salt; Ti content: 6.5 wt. %) and alumina sol (Aluminasol-200, produced by Nissan Chemical Industries, Ltd.; $Al_2O_3$: 10 wt. %, $CH_3COOH$: 3.5 wt. % or less) was applied to both surfaces by a roll coating method so that the coating amount (coating weight) on one surface was a predetermined amount, followed by drying at 100° C. for 1 minute.

Next, a vulcanizing adhesive solution having the following composition was applied by roll coating so that the coating amount on one surface was 2,000 mg/m$^2$, and calcined in an oven furnace at 200° C. for 5 minutes.

| | |
|---|---|
| Resol-type phenol resin (Resitop PL-2108, produced by Gun Ei Chemical Co., Ltd.) | 30 Parts by weight |
| o-Cresol novolak-type epoxy resin (Epikote 180S, produced by Japan Epoxy Resin Co.) | 18 Parts by weight |
| 30 wt. % methyl ethyl ketone solution of colloidal silica (Snowtex MEK-ST, produced by Nissan Chemical Industries, Ltd.) | 40 Parts by weight |
| Fluororubber compound of the afore-mentioned | 40 Parts by weight |

Formulation Example I

| | |
|---|---|
| Hexamethylenetetramine (Nocceler H, produced by Ouchi Shinko Chemical Industrial Co., Ltd.) | 2.5 Parts by weight |
| 2-ethyl-4-methylimidazole | 1.1 Parts by weight |
| Methyl ethyl ketone | 1,481 Parts by weight |

To the thus-formed vulcanizing adhesive layer, a 25 wt. % methyl ethyl ketone solution of a fluororubber compound (Formulation Example I above) was uniformly applied using a knife coater so that the thickness after drying on one surface was 65 μm. After the solvent was dried at room temperature, pressure crosslinking was performed at 160° C. for about 30 minutes to form a rubber layer. Thus, a fluororubber-metal laminated gasket material was obtained.

The film coating properties of the surface treating agents and the adhesion of the obtained rubber-metal laminated gasket materials in high temperature LLC in Examples 1 to 5 and Comparative Examples 1 to 3 were evaluated.

Film coating properties: The surface treating agent was applied to a steel plate by the roll coating method and then dried. The resulting film was evaluated as follows:

No problem in film formation: ○

Film fell out removed, failing to form film: ×

Adhesion in high temperature LLC: The lower half of the rubber-metal laminated gasket material in the vertical direction was dipped in an dipping liquid [LLC (Super LLC, produced by Toyota Castle):water=5:5 (volume ratio)], and left at 150° C. for 100 hours. The lower dipped portion dipped in the dipping liquid and the upper exposed portion (non-dipped portion) exposed to LLC vapor above the dipping liquid were evaluated according to JIS K6894 by a scratch drawing test as follows:

No rubber peeling: ○

Significant rubber peeling: ×

Impossible to evaluate: —

Table 1 below shows the obtained results together with the composition (wt. % as a fluorine-free titanium compound or alumina) of the surface treating agents.

TABLE 1

| Example | Fluorine-free titanium compound | Alumina | Coating amount of surface treating agent (mg/m$^2$) | Film coating properties | High temperature LLC resistance Dipped portion | High temperature LLC resistance Exposed portion |
|---|---|---|---|---|---|---|
| Ex. 1 | 20 | 80 | 30 | ○ | ○ | ○ |
| Ex. 2 | 40 | 60 | 100 | ○ | ○ | ○ |
| Ex. 3 | 70 | 30 | 500 | ○ | ○ | ○ |
| Ex. 4 | 80 | 20 | 1000 | ○ | ○ | ○ |
| Ex. 5 | 90 | 10 | 100 | ○ | ○ | ○ |
| Comp Ex. 1 | 10 | 90 | 100 | X | — | — |
| Comp Ex. 2 | 20 | 80 | 1500 | ○ | X | ○ |
| Comp Ex. 3 | 100 | 0 | 100 | ○ | X | ○ |

Examples 6 to 10 and Comparative Examples 4 to 6

In Examples 1 to 5 and Comparative Examples 1 to 3, a nitrile rubber compound of Formulation Example IV above was used in the adhesive components in place of the fluororubber compound. Further, as the rubber compound for forming a rubber layer, a nitrile rubber compound (Formulation Example IV above) was used in the form of a 25 wt. % methyl ethyl ketone solution in place of the fluororubber compound, and this was uniformly applied using a knife coater so that the thickness after drying on one surface was 25 μm. After the solvent was dried at room temperature, pressure crosslinking was performed at 180° C. for about 5 minutes, thereby obtaining a nitrile rubber-metal laminated gasket material. The film coating properties of the surface treating agents and the adhesion of the obtained rubber-metal laminated gasket materials in high temperature LLC were evaluated.

Comparative Example 7

In Example 1, a nitrile rubber-metal laminated gasket material was obtained using a coating type chromate treated metal plate as the metal plate, and without performing a surface treatment using a surface treating agent comprising a fluorine-free titanium compound and alumina sol.

Table 2 below shows the results obtained in Examples 6 to 10 and Comparative Examples 4 to 7.

TABLE 2

| Example | Fluorine-free titanium compound | Alumina | Coating amount of surface treating agent (mg/m$^2$) | Film coating properties | High temperature LLC resistance Dipped portion | High temperature LLC resistance Exposed portion |
|---|---|---|---|---|---|---|
| Ex. 6 | 20 | 80 | 30 | ○ | ○ | ○ |
| Ex. 7 | 40 | 60 | 100 | ○ | ○ | ○ |
| Ex. 8 | 70 | 30 | 500 | ○ | ○ | ○ |
| Ex. 9 | 80 | 20 | 1000 | ○ | ○ | ○ |
| Ex. 10 | 90 | 10 | 100 | ○ | ○ | ○ |
| Comp Ex. 4 | 10 | 90 | 100 | X | — | — |
| Comp Ex. 5 | 20 | 80 | 1500 | ○ | X | ○ |
| Comp Ex. 6 | 100 | 0 | 100 | ○ | X | X |
| Comp Ex. 7 | — | — | — | ○ | X | X |

These results demonstrate the following.

(1) In the Examples, rubber-metal laminated gasket materials having excellent LLC resistance at a high temperature were obtained.

(2) When a surface treating agent containing a titanium compound in an amount less than a predetermined amount was used, no film was formed (Comparative Examples 1 and 4).

(3) When the coating amount of a surface treating agent was used higher than a predetermined amount (Comparative Examples 2 and 5), and when alumina was not used (Comparative Examples 3 and 6), the dipped portion had low adhesion, and these gaskets were not tolerable for use in the actual use environment of engine cylinder head gaskets.

INDUSTRIAL APPLICABILITY

The rubber-metal laminated gasket material of the present invention has excellent LLC resistance at a high temperature, and can therefore be effectively used as an engine cylinder head gasket, etc.

The invention claimed is:

1. A rubber-metal laminated gasket material comprising a metal plate, a surface treating agent layer, an adhesive layer, and a rubber layer, the layers being sequentially laminated on the metal plate in the recited order;
    wherein the surface treating agent layer is formed by applying a surface treating agent so that the coating amount on one surface is 30 to 1,000 mg/m$^2$, and the surface treating agent is free from chromium, has a mixing ratio of 20 to 90 wt. % of a fluorine-free titanium compound and 10 to 80 wt. % of alumina, and the surface treating agent has a metal titanium content of 1 to 20 wt. %,
    wherein the fluorine-free titanium compound is at least one of titanium lactate, ammonium titanium lactate, titanium sulfate, titanium oxysulfate, ammonium titanium sulfate, titanium nitrate, titanium oxynitrate, and ammonium titanium nitrate.

2. The rubber-metal laminated gasket material according to claim 1, wherein the alumina is alumina sol.

3. The rubber-metal laminated gasket material according to claim 1, wherein the rubber is fluororubber or nitrile rubber.

4. The rubber-metal laminated gasket material according to claim 1, which is used as an engine cylinder head gasket.

5. An engine cylinder head gasket using the rubber-metal laminated gasket material according to claim 4.

* * * * *